United States Patent [19]

Greiner et al.

[11] Patent Number: 4,807,846

[45] Date of Patent: Feb. 28, 1989

[54] ELECTROMAGNETICALLY ACTUATABLE FUEL INJECTION VALVE

[75] Inventors: Max Greiner, Gerlingen; Udo Hafner, Lorch; Waldemar Hans, Bamberg; Heinrich Knapp, Leonberg; Wolfgang Kramer, Kemmern; Rudolf Krauss, Stuttgart; Ferdinand Reiter, Markgroningen; Peter Romann, Stuttgart; Rudolf Sauer, Benningen, all of Fed. Rep. of Germany

[73] Assignee: Robert Bosch GmbH, Stuttgart, Fed. Rep. of Germany

[21] Appl. No.: 124,527

[22] Filed: Nov. 24, 1987

[30] Foreign Application Priority Data

Dec. 11, 1986 [DE] Fed. Rep. of Germany ....... 3642311

[51] Int. Cl.$^4$ ....................... F16K 31/08; F02M 51/06

[52] U.S. Cl. ............................... 251/129.15; 239/585; 251/65

[58] Field of Search ............................. 251/65, 129.15; 239/585

[56] References Cited

U.S. PATENT DOCUMENTS 4,653,720 3/1987 Knapp et al. .

*Primary Examiner*—Arnold Rosenthal

*Attorney, Agent, or Firm*—Edwin E. Greigg

[57] ABSTRACT

An electromagnetically actuatable fuel injection valve which serves to supply fuel to a mixture-compressing internal combustion engine having externally supplied ignition. The fuel injection valve includes a valve housing with a mouth piece in which a valve seat body is disposed, two magnet coils two cores and one armature, which has a spherical guide section and is connected to a valve needle. The spherical guide section is slidably supported with its circumference in a guide bore of the valve seat body and in its stroke movement away from the core is limited by a tapering stop opening which adjoins the guide bore. A plastic bushing is mounted on a guide step of the valve seat body and is pressed by a spring against the core end face, thereby preventing a dirct flow of fuel to the remnant air gap on the armature, as a result of which the depositing of soil particles in the gap is avoided.

4 Claims, 1 Drawing Sheet

ELECTROMAGNETICALLY ACTUATABLE FUEL INJECTION VALVE

BACKGROUND OF THE INVENTION

The invention is based on an electromagnetically actuatable fuel injection valve as defined hereinafter. A fuel injection valve is already known in which the remnant air gap formed between the armature and the core is located directly in the flow of fuel, so that magnetic or nonmagnetic particles can continue to adhere in this remnant air gap and can even penetrate the surfaces of the core and the armature, which undesirably changes the opening and closing behavior of the fuel injection valve and thus results in incorrect metering of the fuel injection quantity.

OBJECT AND SUMMARY OF THE INVENTION

The electromagnetically actuatable fuel injection valve has the advantage over the prior art that the direct fuel flow and hence particles of dirt entrained with it are kept away from the remnant air gap formed between the armature and the core, thus improving and prolonging the functional capacity of the fuel injection valve.

Further improvements to the fuel injection valve as revealed herein are also attainable as will be denoted as the description progresses. It is advantageous to press the plastic bushing against the core by means of a spring, so that even when the motor vehicle is transversing a very rough roadway, adequate sealing is assured.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
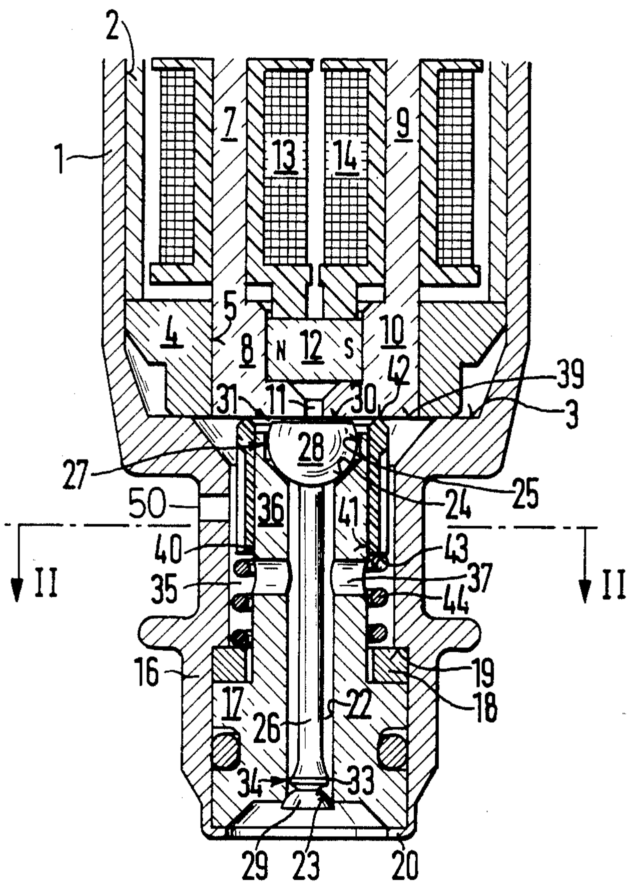
FIG. 1 shows an exemplary embodiment of a fuel injection valve embodied in accordance with the invention.

The fuel injection valve shown in FIG. 1, for a fuel injection system of a mixture-compressing internal combustion engine having externally supplied ignition, has a valve housing 1, the stepped inner housing bore 2 of which has a first shoulder 3, on which a base plate 4 rests. Protruding into the central recess 5 of the base plate 4 are a first pole piece 7 having a first bent pole 8 and a second pole piece 9 having a second bent pole 10. Between themselves, the poles 8 and 10, oriented toward one another, form a pole air gap 11, which is spanned in part by a permanent magnet 12. Inside the inner housing bore 2, a first magnet coil 13 is disposed on the first pole piece 7 and a second magnet coil 14 is disposed on the second pole piece 9, the coils being located above the poles 8, 10.

Adjacent to the region which receives the magnet coils, the valve housing 1 has a mouth piece 16 of smaller diameter with which the inner housing bore 2 is coextensive and which at least partly receives a valve seat body 17, which rests via a shim 18 on a second shoulder 19 of the inner housing bore 2. The rim of the mouth piece 16, in a flanged over portion 20, partly surrounds the valve seat body 17 and presses it toward the second shoulder 19 against the shim 18. In the axial direction, the valve seat body 17 has a through flow bore 22, which discharges outward into a fixed valve seat 23 embodied on the valve seat body 17. Remote from the valve seat 23, the flow bore 22 merges with an oblique stop opening 24, the diameter of which increases in conical fashion up to an adjoining cylindrical guide bore 25. A valve needle 26 passes with play through the flow bore 22, and an armature 27 of ferromagnetic material is fixed on one end of the valve needle 26, the armature 27 being attached to the valve needle 26 by a spherically embodied guide section 28 that is slidably supported in the guide bore 25 with little radial play. Remote from the armature 27, a closing head 29 is embodied on the valve needle 26 and arranged to cooperate with the valve seat 23. The armature has a flattened working face 30 oriented toward the pole pieces 7, 9 acting as a core, and when the magnet coils 13, 14 are not excited, the armature 27 is attracted toward the poles 8, 10 by the permanent magnetic field of the permanent magnet 12, but a remnant air gap 31 remains between the armature and the poles when the closing head 29 is resting on the valve seat 23. It is to be understood that in this position, the spherical guide section 28 has lifted away from the stop opening 24. The radial guidance of the spherical guide section 28 and hence of the armature 27 is effected on the circumference of the guide section, by virtually line contact in the guide bore 25. Directly upstream of the closing head 29, a metering collar 33 is embodied on the valve needle 25, acting with the wall of the flow bore 22 as a throttle restriction for the fuel and forming an annular metering gap 34, at which for example approximately 90% of the fuel pressure, relative to the ambient pressure prevailing downstream of the valve seat 23, drops. The remaining 10% of the fuel pressure relative to the ambient pressure drops at the flow cross section between the valve seat 23 and the closing head 29. Disposing the annular metering gap 34 directly upstream of the valve seat 23 has the advantage that the fuel metering takes place at a location at which the annular metering gap does not become plugged with components of the intake tube atmosphere, such as superfine dust and particles from recirculated exhaust gas, which would cause the metered fuel quantity to vary during operation. The delivery of fuel to the flow bore 22 is effected by a fuel feed pump, not shown, via a fuel delivery connection 50 in the housing body 2 to an annular conduit 35 between the valve seat body 17 and the inner housing bore 2, and on the other hand, the radial bores 37 which lead from this inner bore 2 to the flow bore 22.

As already explained, when the magnet coils 13, 14 are not excited, the armature 27 is attracted by the permanent magnetic field 12 toward the poles 8, 10, thus retaining the closing head 29 on the valve seat 23. Upon excitation of the magnet coils 13, 14, the permanent magnetic flux at the armature 27 is countered by an approximately equal electromagnetic flux, so that the pressure of the fuel engaging the valve needle in the opening direction of the valve is sufficient to lift the closing head 29 from the valve seat 23, and the armature 27 can execute a stroke movement until the guide section 28 comes to rest on the wall of the stop opening 24. The stroke movement of the armature 27 or of the closing head 29 relative to the valve seat 23 can be adjusted in a known manner prior to the mounting of the armature 27 or guide section 28 on the valve needle 26. When the closing head 29 has lifted outward away from the valve seat 23, the fuel flowing to the valve seat 23 at the same time centers the valve needle 26 in the flow bore 22.

Figure 2:
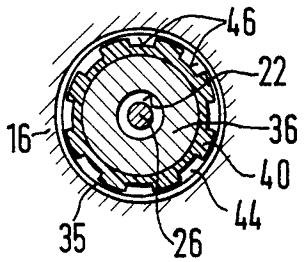
FIG. 2 is a section taken along the line II—II of FIG. 1.

With its end having the working face 30, the armature 27 protrudes partway out of the guide 36 of the valve seat body 17 and forms the remnant air gap 31, which when the closing head 29 is resting on the valve seat 23 amounts to approximately 0.03 mm, between the working face 30 and the core end face 39, facing the armature 27, of the poles 8, 10. In this instance, the core end face 39 is likewise embodied as flat. The guide 36 likewise terminates spaced axially apart from the core end face 39. According to the invention, a plastic bushing 40 is mounted on the outer circumference of the guide 36, such that it rests tightly on the guide 36, and a direct flow of fuel between the plastic bushing 40 and the outer circumference of the guide 36 is avoided. Preferably, the outer circumference of the guide 36 is embodied as cylindrical, and the plastic bushing 40 is mounted with a circular inner bore 41 on this guide 36. The end of the plastic bushing 40 which rests on the poles 8, 10 surrounds the armature 27, with play and is provided with an upper circumferential knife edge 42 so as to assure the tightest possible contact of the plastic bushing 40 with the core end face 39 and avoid a direct flow of fuel to the remnant air gap 31. The lower end 43 of the plastic bushing 40 remote from the knife edge 42 is engaged by a spring 44, embodied for example as a helical spring, which urges the plastic bushing 40 toward the core end face 39 with the lower end being supported on the shim 18. As is shown more clearly in FIG. 2, longitudinal grooves 46 are provided in the jacket face of the plastic bushing 40, extending in the direction of the longitudinal axis of the valve thus assuring an unthrottled flow of the fuel in the annular conduit 35 to the radial bores 37. The plastic bushing 40 which rests tightly on the core end face 39 and the guide step 36 prevents a direct fuel flow to the remnant air gap 31, thus preventing soil particles from being transported to the remnant air gap 31 and adhering there; as a result, extremely accurate operation of the fuel injection valve over a relatively long period of operation, and a prolongation of the service life of the fuel injection valve, are attained.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable fuel injection valve comprising a valve housing, a valve seat body disposed at least partly in the valve housing, at least one magnet coil, a core and an armature connected to a valve closing member, said closing member being slidably supported in the valve seat body and further including a working face oriented toward the core which protrudes partway out of a guide (36) of the valve seat body which guide is oriented toward the core and is spaced axially apart from it, and a plastic bushing (40) having upper and lower ends mounted on the guide (36) of the valve seat body (17), the upper end (42) of the bushing arranged to rest on the core (39) and surround the armature (27) with play.

2. A fuel injection valve as defined by claim 1, in which the said upper and end of the plastic bushing (40) that rests on the core (39) comprises a knife edge (42).

3. A fuel injection valve as defined by claim 1, in which a spring (44) engages the lower end (43) of the plastic bushing (40) and urges the plastic bushing (40) toward the core (39).

4. A fuel injection valve as defined by claim 1, in which longitudinal grooves (46) are provided in a jacket face of the plastic bushing (40).

* * * * *